United States Patent [19]

Lim

[11] Patent Number: 4,814,630

[45] Date of Patent: Mar. 21, 1989

[54] DOCUMENT ILLUMINATING APPARATUS USING LIGHT SOURCES A, B, AND C IN PERIODIC ARRAYS

[75] Inventor: Tuan-Kay Lim, Waterloo, Canada

[73] Assignee: NCR Corporation, Dayton, Ohio

[21] Appl. No.: 67,755

[22] Filed: Jun. 29, 1987

[51] Int. Cl.⁴ .............................................. H01J 40/14
[52] U.S. Cl. ..................................... 250/578; 250/226
[58] Field of Search ................... 250/578, 226; 355/37, 355/70; 358/293, 294, 75; 356/402; 235/465, 469; 362/231

[56] References Cited

U.S. PATENT DOCUMENTS

| | | | |
|---|---|---|---|
| 3,567,909 | 3/1971 | Allen | 235/469 |
| 3,576,428 | 4/1971 | Kapsambelis et al. | 235/465 |
| 3,663,801 | 5/1972 | Wahli et al. | 235/61.11 E |
| 3,721,828 | 3/1973 | Parks | 250/220 R |
| 3,737,629 | 6/1973 | See | 235/61.1 E |
| 4,023,040 | 5/1977 | Weber | 250/566 |
| 4,044,227 | 8/1977 | Holm et al. | 235/61.7 R |
| 4,172,554 | 10/1979 | Clarinval et al. | 235/465 |
| 4,443,694 | 4/1984 | Sanford | 235/465 |
| 4,556,903 | 12/1985 | Blitchington et al. | 358/294 |
| 4,568,984 | 2/1986 | Juergensen et al. | 358/293 |
| 4,631,579 | 12/1986 | Hoffrichter et al. | 358/75 |
| 4,642,679 | 2/1987 | Nagano | 358/75 |
| 4,670,779 | 6/1987 | Nagano | 358/75 |

Primary Examiner—David C. Nelms
Assistant Examiner—William L. Oen
Attorney, Agent, or Firm—Wilbert Hawk, Jr.; Albert L. Sessler, Jr.; Elmer Wargo

[57] ABSTRACT

A document imaging apparatus which is used to illuminate a portion of a document at a scanning line in a scanning plane of the apparatus. First and second light arrays are positioned symmetrically with respect to the optical axis of the apparatus, which optical axis is perpendicular to the scanning line. Each of the first and second arrays includes light sources A, B, and C which are arranged in a periodic, repeating sequence ABCA to provide a superposition of light in both spatial and spectral domains at the scanning line. Light emitting diodes, for example, may be used as the light sources.

20 Claims, 2 Drawing Sheets

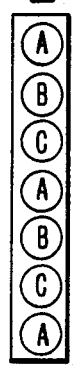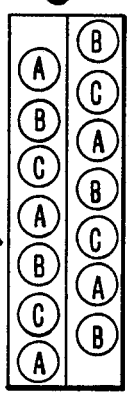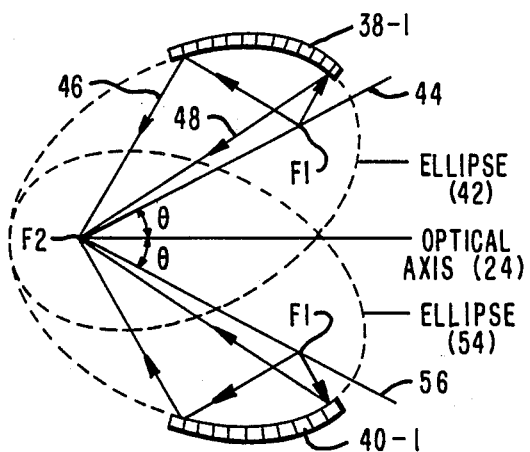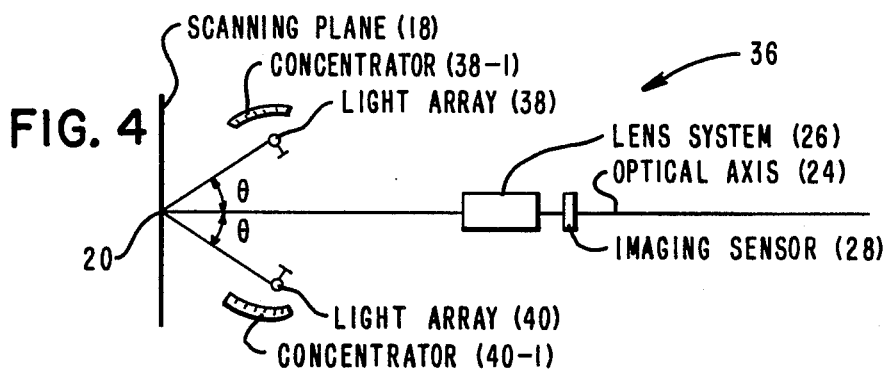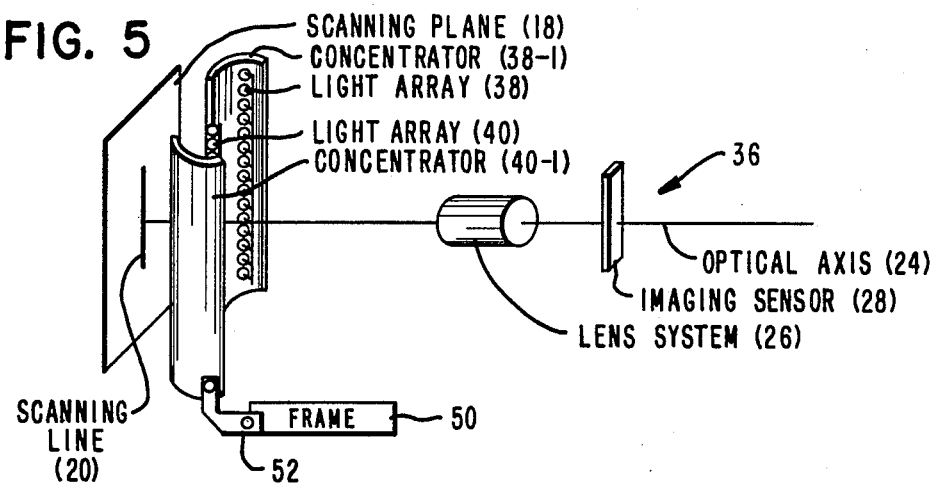

DOCUMENT ILLUMINATING APPARATUS USING LIGHT SOURCES A, B, AND C IN PERIODIC ARRAYS

BACKGROUND OF THE INVENTION

This invention relates to a document illuminating apparatus in general, and in particular, it relates to an illuminating apparatus which is especially useful for evenly illuminating a narrow scanning line used, for example, in document imaging and photocopying apparatuses.

Currently, arrays of green light emitting diodes (LEDs) are used for illuminating documents in some facsimile machines. These LEDs typically emit light at a peak wavelength of 565 nanometers with a spectral width of 60 nanometers. For black and white documents with a sufficiently high contrast, using such green LEDs produces good document images. However, for colored documents, the narrow-spectrum light source from the green LEDs mentioned may not be suitable. For example, with the LEDs mentioned, a light color background on a document may appear darker than expected on an image of the document whereas a dark character printed in a certain color on the document may turn out lighter than expected on the image. As a consequence, the contrast between the character and its background will be significantly reduced. In an extreme case, this reduction of contrast can lead to a loss of information in the final electronic image.

SUMMARY OF THE INVENTION

In one aspect, a preferred embodiment of this invention relates to an apparatus for illuminating a scanning line including: a scanning plane having the scanning line therein; an optical axis positioned substantially perpendicular to the scanning plane at the scanning line; first and second light arrays; each of the first and second light arrays having light sources A, B, and C arranged in a periodic, repeating sequence ABCA in which the light sources A, B, and C each have a different optical radiation; and positioning means for positioning the first and second light arrays relative to the optical axis to direct the associated optical radiations of the light sources A, B, and C at the scanning line so that the resulting spectral distribution of the optical radiations at the scanning line will be the same for all points along the scanning line.

In another aspect, this invention relates to an imaging apparatus including: a scanning plane having a scanning line therein; transport means for moving documents to be imaged along the scanning plane past the scanning line; an optical axis positioned substantially perpendicular to the scanning plane at the scanning line; a light sensitive array positioned along the optical axis; a lens system for directing light reflected from a document at the scanning line through the lens system to the light sensitive array; first and second light arrays; each of the first and second light arrays having light sources A, B, and C arranged in a periodic, repeating sequence ABCA in which the light sources A, B, and C each have a different optical radiation; and positioning means for positioning the first and second light arrays relative to the optical axis to direct the associated optical radiations of the light sources A, B, and C at the scanning line so that the resulting spectral distribution of the optical radiations at the scanning line will be the same for all points along the scanning line.

A feature of this invention is that it utilizes the principle of superposition in both spectral and spatial domains.

Another feature of this invention is that it is low in cost to implement.

Another feature is that this invention can be used with LEDs to adapt the resulting system to the documents being imaged.

These features and others will be more readily understood in conjunction with the following specification, claims and drawing.

BRIEF DESCRIPTION OF THE DRAWING

FIG. 2 is a diagrammatic view, showing how light sources A, B, and C in a light array are arranged in a periodic, repeating sequence ABCA;

FIG. 3 is a view similar to FIG. 2, showing how first and second light arrays are offset relative to each other in a direction along the scanning line of the apparatus;

FIG. 4 is a plan view, in diagrammatic form, of a second embodiment of this invention which uses light concentrators for directing light at the associated scanning line;

FIG. 5 is a side view, in perspective, of the embodiment shown in FIG. 4;

FIG. 6 is a cross-sectional view, in diagrammatic form, of the light concentrators shown in FIGS. 4 and 5.

DETAILED DESCRIPTION OF THE INVENTION

Figure 1:
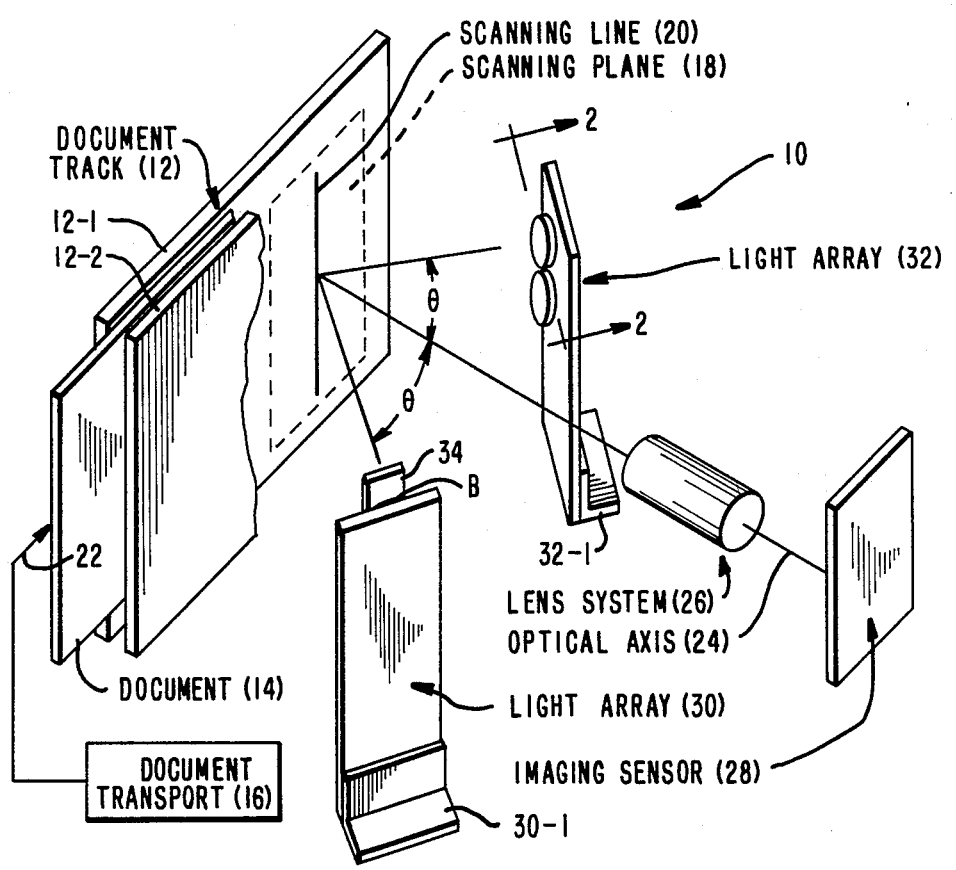
FIG. 1 is a general diagrammatic view, in perspective, of an imaging apparatus made according to this invention.

FIG. 1 is a general diagrammatic view, in perspective, of an apparatus 10, made according to this invention, for illuminating a scanning line in a scanning plane. While the apparatus 10 may be used for many applications in which a narrow strip of uniform illumination is required, as in facsimile, photocopying, machine vision, robotics, and industrial inspection applications, the particular apparatus 10 shown relates to an apparatus for imaging documents, like checks, in a financial institution, like a bank.

The apparatus 10 includes a document track 12 having upstanding side walls 12-1 and 12-2 which are spaced apart as shown in FIG. 1 to receive a document 14 therebetween. The document track 12 and the document transport 16 provide the means for moving the document 14 in a scanning plane (shown by the dashed rectangle 18) which includes a scanning line 20. In the embodiment described, the scanning line 20 is vertically oriented and is perpendicular to the movement of the document 14 in the document track 12, as indicated by arrow 22.

The apparatus 10 also includes an optical axis 24 which is positioned perpendicularly to the scanning line 20. A lens system 26 is used to direct light reflected from the document 14 at the scanning line through the lens system 26 to the imaging sensor 28.

Two light arrays 30 and 32 (FIG. 1) are used to illuminate the scanning line 20, and they are part of the apparatus 10. In the embodiment described, the light arrays 30 and 32 are positioned symmetrically with respect to the optical axis by conventional positioning means such as brackets 30-1 and 32-1. The light arrays 30 and 32 are also positioned at an angle theta ($\theta$) wit respect to the optical axis 24, which angle is about 30 degrees. The function of the light arrays 30 and 32 is to provide light at the scanning line 20 which results from both spatial and spectral superposition.

Each light array 30 and 32 has light sources A, B, and C which are arranged in a periodic, repeating sequence ABCA as shown best in FIG. 2. Each of the light sources A, B, and C emits a different optical radiation so that the outputs of the light arrays 30 and 32, when directed at the scanning line 20, will produce a resultant spectral distribution of optical radiation which is the sum of the spectral distribution of the optical radiations from the light sources A, B, and C. In other words, the resultant spectral distribution will be the same for all points along the scanning line 20. In this regard the light arrays 30 and 32 are offset relative to each other in a direction which is along the scanning line 20 so that if placed in side by side relationship, they would have the relationship shown in FIG. 3. Notice that any one light source in one array would be positioned between two different light sources in the opposed array. For example, the topmost light source A (as viewed in FIG. 3) in light array 32 is positioned between the light sources B and C in light array 30. Correspondingly, the bottommost light source B in light array 30 is positioned between the light sources C and A in light array 32. As a consequence, the light intensity and the spectral content at any given point along the scanning line 20 are due to the complementary light sources A, B, and C. As a result, the illumination pattern for a document 14 (FIG. 1) which is illuminated at the scanning line 20 will have the following characteristics:

1. There will be a uniform light intensity over the entire scanning line 20; and
2. For each point along the scanning line 20, the resultant spectral distribution of the optical radiation thereat will be the sum of the spectral distributions of the light sources A, B, and C.

Another feature of this invention is that the light sources A, B, and C are selected to have the appropriate spectral distributions for the particular application in which the apparatus 10 is used. For example, when processing financial documents 14, like checks, the light sources A, B, and C may be green, yellow, and red LEDs, respectively. These are conventional LEDs, with each LED having its own associated focusing lens, like lens 34, shown only schematically for light source B in FIG. 1. The optical radiations from the LEDs have the following approximate ranges of wavelengths:

Green=525-610 nm;
Yellow=540-640 nm; and
Red=575-705 nm.

Based on the commercial availability of colored LEDs, the principles of this invention could be expanded to include other colors of LEDs, such as blue, green, and red, for example.

With regard to the discussion of the light arrays 30 and 32, it was previously stated that each of the light sources A, B, and C had its own associated focusing lens 34 to direct light at the scanning line 20. Naturally, in this type of system, the lens system 26 directs the light reflected from a document 14 along the scanning line 20 to a small conventional imaging sensor 28 which itself includes an array of light sensors with each sensor representing a "pixel" or picture area or element at the scanning line 20.

The principles of this invention can also be extended to include an apparatus in which the light sources A, B, and C have no integral focusing lenses. In this regard, FIGS. 4, 5, and 6 show a second embodiment of the invention in which the apparatus utilizes an external light concentrator to direct light from the light arrays to the scanning line.

The apparatus 36 shown in FIGS. 4, 5, and 6 is generally similar to the apparatus 10 (FIG. 1) already described; consequently, the same reference numerals used in FIG. 1 will be used to describe identical parts in FIGS. 4, 5, and 6. FIGS. 4, 5 and 6 are also schematically presented so as to further simplify these figures. The principal difference between the apparatus 36 and the apparatus 10 is that the first and second light arrays 38 and 40 do not have a focusing lens 34 (FIG. 1) associated with each of the light sources A, B, and C in the light arrays 30 and 32. In addition, the apparatus 36 includes a light concentrator 38-1 for the light array 38, and similarly, a light concentrator 40-1 is included for the light array 40. The light sources in the light arrays 38 and 40 are arranged in the same periodic, repeating sequence ABCA as discussed in relation to apparatus 10, and they may be comprised of the various LEDs mentioned with regard to apparatus 10.

The light concentrators 38-1 and 40-1 are identical; consequently, only a description of light concentrator 38-1 will be given. The light concentrator 38-1 is a cylindrical reflector whose cross section is a portion of an ellipse. For example, FIG. 6 shows a cross-sectional view of the light concentrators 38-1 and 40-1. Notice that the cross section of the light concentrator 38-1 is a portion of an ellipse 42 shown in dashed outline. The major axis 44 of the ellipse 42 is positioned at the angle theta ($\theta$) to the optical axis 24. The light array 38 is positioned at one of the focal points F1 of the ellipse 42 while the scanning line 20 is positioned at the other focal point F2. The light array 38 is positioned so that it extends in a direction along the scanning line 20 and is parallel thereto. The individual light sources A, B, and C of the light array are arranged in a periodic, repeating sequence like that shown in FIG. 2, and the light sources A, B, and C are positioned to direct their outputs at the light concentrator 38-1. Light from the light concentrator 38-1 is then directed at the scanning line 20 (as represented by focal point F2) as shown by light directing arrows 46 and 48, for example. The light concentrators 38-1 and 40-1 have conventional, highly reflective surfaces to direct the light as described, and they are adjustably positioned in a frame 50 of the apparatus 36 by a bracket 52 (FIG. 5).

The focal point F2 (FIG. 6) is a common focal point for ellipses 42 and 54. Notice also from FIG. 6 that the light concentrators 38-1 and 40-1 have cross sections which are not symmetrical with respect to their associated major axes 44 and 56, respectively. This is an important feature of the light concentrators 38-1 and 40-1 and is due to a constraint which is dictated by the characteristics of LEDs when they are used as the light sources A, B, and C.

Figure 7:
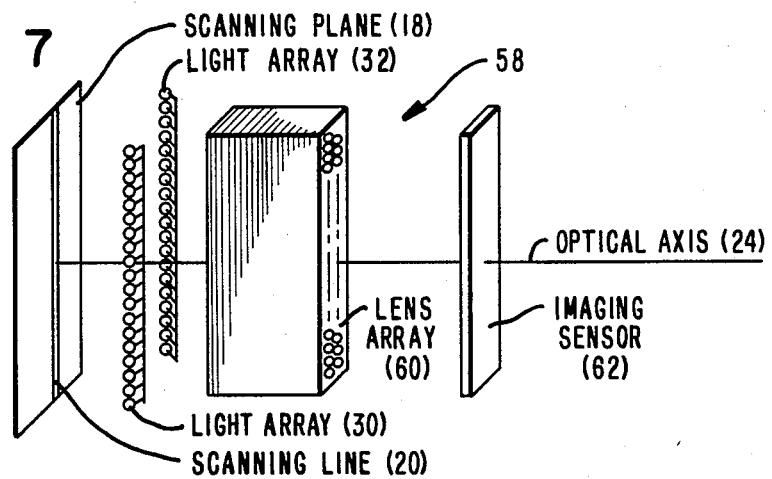
FIG. 7 is a diagrammatic view, in perspective, of another embodiment of the imaging apparatus of this invention.

FIG. 7 shows another embodiment of the imaging apparatus which is designated generally as 58. The apparatus 58 is identical to the apparatus 10 already described in relation to FIG. 1 except as will be described hereinafter; consequently, the same reference numerals will be used to describe similar parts of apparatus 58.

The light arrays 30 and 32 direct light at the scanning line 20 located in the scanning plane 18 as previously described in relation to apparatus 10 (FIG. 1). The principal differences between the apparatus 58 and the apparatus 10 are that the apparatus 58 uses a self-focusing lens array 60 and a larger imaging sensor 62 instead of the conventional photographic lens system 26 and the smaller imaging sensor 28. The self-focusing lens array 60 is commercially available as part number SLA-09 from NSG America, Inc., for example. An advantage of the apparatus 58 is that the size of the image formed by the lens array 60 is the same as the size of the scanning line 20.

What is claimed is:

1. An apparatus for illuminating a scanning line comprising:
    a scanning plane having said scanning line therein;
    an optical axis positioned substantially perpendicularly to said scanning plane at said scanning line;
    first and second light arrays;
    each of said first and second light arrays having light sources A, B, and C arranged in a periodic, repeating sequence ABCA in which each of the light sources A, B, and C has a different optical radiation; and
    positioning means for positioning said first and second light arrays relative to said optical axis to direct the associated optical radiations of said light sources A, B, and C at said scanning line so that the resulting spectral distribution of said optical radiations at said scanning line will be the same for all points along said scanning line.

2. The apparatus as claimed in claim 1 in which said light sources A, B, and C are light emitting diodes.

3. The apparatus as claimed in claim 1 in which said light sources A, B, and C are green, yellow, and red light emitting diodes, respectively.

4. The apparatus as claimed in claim 1 in which each of said first and second light arrays has the associated light sources A, B, and C arranged in said repeating sequence ABCA in side by side relationship to form a straight line.

5. The apparatus as claimed in claim 4 in which said first and second light arrays are positioned on opposite sides of said optical axis.

6. The apparatus as claimed in claim 5 in which said light sources A, B, and C are light emitting diodes, with each said light source A, B, and C having an integral focusing lens associated therewith.

7. The apparatus as claimed in claim 5 in which said light sources A, B, and C are green, yellow and red light emitting diodes, respectively.

8. The apparatus as claimed in claim 5 in which said light sources A, B, and C are blue, green, and red light emitting diodes, respectively.

9. An imaging apparatus comprising:
    a scanning plane having a scanning line therein;
    transport means for moving documents to be imaged along said scanning plane past said scanning line;
    an optical axis positioned substantially perpendicularly to said scanning plane at said scanning line;
    a light sensitive array positioned perpendicularly to said optical axis;
    a lens system for directing light reflected from a document at said scanning line through said lens system to said light sensitive array;
    first and second light arrays;
    each of said first and second light arrays having light sources A, B, and C arranged in a periodic, repeating sequence ABCA in which each of the light sources A, B, and C has a different optical radiation; and
    positioning means for positioning said first and second light arrays relative to said optical axis to direct the associated optical radiations of said light sources A, B, and C at said scanning line so that the resulting spectral distribution of said optical radiations at said scanning line will be the same for all points along said scanning line.

10. The imaging apparatus as claimed in claim 9 in which the optical radiations of said light sources A, B, and C are selected with regard to the documents to be imaged.

11. The imaging apparatus as claimed in claim 10 in which said light sources A, B, and C are light emitting diodes.

12. The imaging apparatus as claimed in claim 10 in which said light sources A, B, and C are green, yellow, and red light emitting diodes, respectively.

13. The imaging apparatus as claimed in claim 10 in which each of said first and second light arrays has the associated light sources A, B, and C arranged in said repeating sequence ABCA in side by side relationship to form a straight line and in which said first and second light arrays are positioned on opposite sides of said optical axis.

14. The imaging apparatus as claimed in claim 13 in which said first and second light arrays are offset relative to each other in a direction along said scanning line.

15. The imaging apparatus as claimed in claim 14 in which said light sources A, B, and C are light emitting diodes, with each said light source A, B, and C having an integral focusing lens associated therewith.

16. The imaging apparatus as claimed in claim 15 in which said lens system includes a selffocusing lens array whose length as measured along said scanning line is sufficient to produce an image at said light sensitive array which is the same as an associated object at said scanning line.

17. The imaging apparatus as claimed in claim 14 in which said imaging apparatus also includes a cylindrically-shaped elliptical reflector for each of said first and second light arrays for directing light from the associated first and second light arrays on to said scanning line.

18. A light array for use in illuminating a scanning line comprising:
    light sources A, B, and C arranged in side by side arrangement to produce a periodic, repeating sequence ABCA in which the light sources A, B, and C each have different optical radiations; and
    means for holding said light sources A, B, and C in said periodic, repeating sequence ABCA in a straight line so that the outputs of said light sources A, B, and C, when directed at said scanning line, will produce a resultant spectral distribution of optical radiation which is the same for all points along said scanning line.

19. The light array as claimed in claim 18 in which each of said light sources A, B, and C is a light emitting diode, with each said light emitting diode having an integral focusing lens associated therewith.

20. The light array as claimed in claim 19 in which the optical radiations of said light sources A, B, and C are selected with regard to documents to be illuminated by said light array.

* * * * *